(12) United States Patent
Hirose et al.

(10) Patent No.: US 10,361,422 B2
(45) Date of Patent: Jul. 23, 2019

(54) CURRENT INTERRUPTION DEVICE AND ELECTRICITY STORAGE DEVICE INCLUDING THE SAME

(71) Applicants:KABUSHIKI KAISHA TOYOTA JIDOSHOKKI, Kariya-shi, Aichi (JP); Eagle Industry Co., Ltd., Tokyo (JP)

(72) Inventors: Takayuki Hirose, Kariya (JP); Mikiya Kurita, Kariya (JP); Ryuji Oide, Kariya (JP); Toshiaki Iwa, Tokyo (JP); Yoshihiro Ogawa, Tokyo (JP); Makoto Mitsuyasu, Tokyo (JP); Norimitsu Akiyoshi, Tokyo (JP)

(73) Assignees: Kabushiki Kaisha Toyota Jidoshokki, Kariya-shi, Aichi (JP); Eagle Industry Co., Ltd., Tokyo (JP)

( * ) Notice: Subject to any disclaimer, the term of this patent is extended or adjusted under 35 U.S.C. 154(b) by 50 days.

(21) Appl. No.: 15/577,540

(22) PCT Filed: May 11, 2016

(86) PCT No.: PCT/JP2016/064058
§ 371 (c)(1),
(2) Date: Nov. 28, 2017

(87) PCT Pub. No.: WO2016/194571
PCT Pub. Date: Dec. 8, 2016

(65) Prior Publication Data
US 2018/0183035 A1    Jun. 28, 2018

(30) Foreign Application Priority Data
May 29, 2015    (JP) .................................. 2015-110316

(51) Int. Cl.
*H01M 2/34* (2006.01)
*H01G 2/18* (2006.01)
*H01G 11/16* (2013.01)

(52) U.S. Cl.
CPC .............. *H01M 2/345* (2013.01); *H01G 2/18* (2013.01); *H01G 11/16* (2013.01); *H01M 2200/20* (2013.01)

(58) Field of Classification Search
None
See application file for complete search history.

(56) References Cited

U.S. PATENT DOCUMENTS

2011/0183163 A1    7/2011  Suzuki et al.

FOREIGN PATENT DOCUMENTS

| JP | 11-176417 A | 7/1999 |
|---|---|---|
| JP | 2005-108503 A | 4/2005 |

(Continued)

OTHER PUBLICATIONS

International Search Report for PCT/JP2016/064058, dated Aug. 9, 2016.

(Continued)

*Primary Examiner* — Sarah A. Slifka
(74) *Attorney, Agent, or Firm* — Sughrue Mion, PLLC

(57) ABSTRACT

A current interruption device includes a conductive plate and a first deformable plate. The conductive plate includes a center portion and a peripheral portion surrounding the center portion. An upper surface of the center portion is formed in a planar shape spreading in a first direction and a second direction orthogonal thereto in a conductive state. The peripheral portion includes an inclined portion extending outward from a boundary between the center portion and the peripheral portion. An upper surface of the inclined portion is inclined so as to increase a distance to the first (Continued)

deformable plate as the upper surface of the inclined portion becomes farther away from the center portion when the conductive plate and the first deformable plate are viewed along the first direction or the second direction in the conductive state.

9 Claims, 10 Drawing Sheets

(56) References Cited

FOREIGN PATENT DOCUMENTS

| | | |
|---|---|---|
| JP | 2011-150966 A | 8/2011 |
| JP | 2014-2901 A | 1/2014 |
| JP | 2014-86319 A | 5/2014 |
| WO | 2014/064511 A1 | 5/2014 |

OTHER PUBLICATIONS

Written Opinion of the International Searching Authority for PCT/JP2016/064058, dated Aug. 9, 2016 (PCT/ISA/237).

Translation of Written Opinion of the International Searching Authority dated Aug. 9, 2016, in counterpart International Application No. PCT/JP2016/064058.

CURRENT INTERRUPTION DEVICE AND ELECTRICITY STORAGE DEVICE INCLUDING THE SAME

CROSS REFERENCE TO RELATED APPLICATIONS

This application is a National Stage of International Application No. PCT/JP2016/064058 filed May 11, 2016, claiming priority based on Japanese Patent Application No. 2015-110316, filed May 29, 2015, the contents of all of which are incorporated herein by reference in their entirety.

TECHNICAL FIELD

This application claims priority to Japanese Patent Application No. 2015-110316, filed on May 29, 2015, the entire contents of which are hereby incorporated by reference into the present application. A technique disclosed in the present description relates to a current interruption device and an electricity storage device including the same.

BACKGROUND

A sealed battery described in Japanese Unexamined Patent Application Publication No. 2011-150966 includes an anti-explosion mechanism that interrupts a current path when an internal pressure of the battery increases. This anti-explosion mechanism includes a diaphragm, a connection plate connected to the diaphragm, and a connection lead welded to the connection plate. When the internal pressure of the battery increases, the diaphragm deforms, and the diaphragm and the connection plate are separated, as a result of which electric connections of electrodes and electrode terminals are interrupted.

SUMMARY

In the sealed battery of Japanese Unexamined Patent Application Publication No. 2011-150966, the electric connections of the electrodes and the electrode terminals are interrupted when the anti-explosion mechanism is activated, and thus overcharging and the like can be prevented. However, in this sealed battery, the diaphragm may displace toward the connection plate by its own weight after the activation of the anti-explosion mechanism, and the conduction therebetween may be regained by the diaphragm and the connection plate making contact again. The description herein discloses a simple-structured current interruption device that can avoid such reconduction after current interruption, and an electricity storage device provided with this current interruption device.

The present description discloses a current interruption device accommodated in a casing and configured to switch between a conductive state where an electrode assembly accommodated in the casing and an electrode terminal provided on the casing are electrically connected and a non-conductive state where the electrode assembly and the electrode terminal are electrically disconnected, the current interruption device may comprise: a conductive plate configured to be electrically connected to the electrode assembly; and a first deformable plate disposed to face the conductive plate and configured to be electrically connected to the electrode terminal, wherein the conductive plate includes a center portion and a peripheral portion surrounding the center portion, the first deformable plate is configured to make contact with and be electrically connected to the conductive plate at the center portion in the conductive state, and the first deformable plate is configured to be separated from and be electrically disconnected from the conductive plate in the non-conductive state, an upper surface of the center portion of the conductive plate has a planar shape spreading in a first direction and a second direction orthogonal to the first direction in the conductive state, the peripheral portion of the conductive plate includes an inclined portion extending outward from a boundary between the center portion and the peripheral portion, and when the conductive plate and the first deformable plate are viewed along the first direction or the second direction in the conductive state, an upper surface of the inclined portion is inclined such that a distance from the upper surface of the inclined portion to the first deformable plate increases at portions of the upper surface of the inclined portion that are located farther away from the center portion.

In the above current interruption device, when viewed along the first direction or the second direction, the upper surface of the inclined portion of the conductive plate is shaped so as to define a longer distance between the upper surface of the inclined portion of the conductive plate and the first deformable plate at the portions of the upper surface of the inclined portion that are located farther away from the center portion in the conductive plate. Due to this, in the non-conductive state, the distance between the conductive plate and the first deformable plate can sufficiently be secured, and the conductive plate and the first deformable plate can be suppressed from regaining contact therebetween. Due to this, the conductive plate and the first deformable plate can be suppressed from regaining the conduction therebetween.

Further, the description herein further discloses an electricity storage device provided with the aforementioned current interruption device.

DETAILED DESCRIPTION

Figure 1:
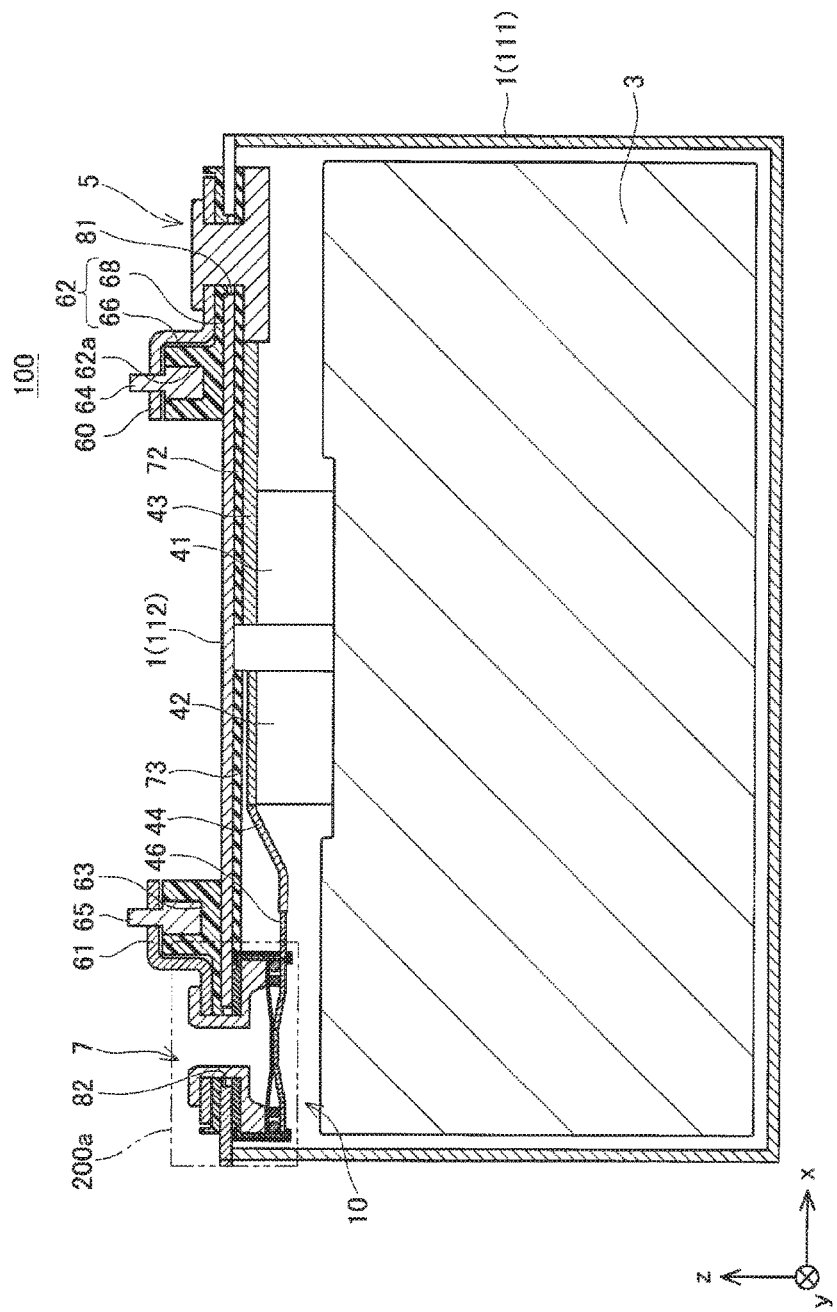
FIG. 1 is a vertical cross-sectional view of an electricity storage device of a first embodiment.

Some of the features characteristic to below-described embodiments will herein be listed. It should be noted that the respective technical elements are independent of one another, and are useful solely or in combinations. The combinations thereof are not limited to those described in the claims as originally filed.

(Feature 1) In a current interruption device disclosed herein, a first deformable plate may include a contact portion configured to make contact with a center portion of a conductive plate in a conductive state, and a first facing portion configured to face an inclined portion of the conductive plate, and when the conductive plate and the first deformable plate are viewed along a first direction or a second direction in the conductive state, a lower surface of the first facing portion of the first deformable plate may be inclined such that a distance from the inclined portion to the first deformable plate increases at portions of the first facing portion that are located farther away from the contact portion. According to such a configuration, a distance between the conductive plate and the first deformable plate can further be ensured long enough even after activation of the current interruption device, and thus the conductive plate and the first deformable plate can further be avoided from regaining the conduction therebetween.

(Feature 2) In the current interruption device disclosed herein, a thickness of the conductive plate may be constant at the inclined portion. According to such a configuration, formation of the conductive plate becomes easier, and cost and forming time thereof can be reduced.

(Feature 3) The current interruption device disclosed herein may further comprise a second deformable plate disposed on an opposite side to the first deformable plate with respect to the conductive plate and provided with a protrusion protruding toward the center portion of the conductive plate. The second deformable plate may be configured to be switched between a first state in which the protrusion is located at a first position and the first deformable plate is in contact with the conductive plate in the conductive state, and a second state in which the protrusion is moved from the first position to a second position on a conductive plate side and separates the first deformable plate from the conductive plate.

(Feature 4) In the current interruption device disclosed herein, the second deformable plate may comprise a second central portion including the protrusion and a second facing portion facing the inclined portion of the conductive plate in the conductive state. Further, when the conductive plate and the second deformable plate are viewed along the first direction or the second direction in the conductive state, an upper surface of the second facing portion of the second deformable plate may be inclined such that a distance from the upper surface of the second facing portion of the second deformable plate to the inclined portion of the conductive plate decreases at portions of the upper surface of the second facing portion that are located farther away from the second central portion in the second deformable plate. An angle formed by a lower surface of the inclined portion and a lower surface of the center portion may be smaller than an angle formed by an upper surface of the central portion and the upper surface of the second facing portion.

(Feature 5) In the current interruption device disclosed herein, a peripheral portion of the conductive plate may include a flat portion extending outward from an outer peripheral edge of the inclined portion. Further, an upper surface of the center portion of the conductive plate and an upper surface of the flat portion may be substantially parallel to each other.

(Feature 6) In the current interruption device disclosed herein, the first facing portion of the first deformable plate may further face the flat portion of the conductive plate.

First Embodiment

Hereinbelow, an electricity storage device 100 of a first embodiment will be described. As shown in FIG. 1, the electricity storage device 100 comprises a casing 1, an electrode assembly 3 accommodated in the casing 1, and terminals 5, 7 as electrode terminals fixed to the casing 1. The electrode assembly 3 and the terminals 5, 7 are electrically connected. Further, the electricity storage device 100 comprises a current interruption device 10 disposed between the electrode assembly 3 and the terminal 7. Electrolyte fills inside of the casing 1, and the electrode assembly 3 is immersed in the electrolyte. A cross sectional view shown in FIG. 1 shows a cross section along centers of a conductive plate 20 and a first deformable plate 30 to be described later.

The casing 1 is constituted of metal, and is a box member having a substantially rectangular solid shape. The casing 1 comprises a main body 111 and a cover 112 fixed to the main body 111. The cover 112 covers an upper portion of the main body 111. Openings 81, 82 are provided in the cover 112. The terminal 5 extends from within the casing 1 to outside thereof through the opening 81, and the terminal 7 extends from within the casing 1 to outside thereof through the opening 82.

The electrode assembly 3 comprises positive sheets, negative sheets, and separators disposed between the positive sheets and the negative sheets. The electrode assembly 3 is configured by laminating a plurality of positive sheets, a plurality of negative sheets, and a plurality of separators. The positive sheets and the negative sheets are provided with current collector members and active material layers provided on the current collector members. As such current collector members, those used for the positive sheets are, for example, aluminum films, and those used for the negative sheets are, for example, copper films. Further, the electrode assembly 3 comprises positive current collector tabs 41 and negative current collector tabs 42. The positive current collector tabs 41 are provided at upper end portions of the positive sheets. The negative current collector tabs 42 are provided at upper end portions of the negative sheets. The positive current collector tabs 41 and the negative current collector tabs 42 protrude upward from the electrode assembly 3. The positive current collector tabs 41 are fixed to a positive lead 43. The negative current collector tabs 42 are fixed to a negative lead 44.

The positive lead 43 is connected to the positive current collector tabs 41 and the terminal 5. The positive current collector tabs 41 and the terminal 5 are electrically connected through the positive lead 43. An insulation member 72 is disposed between the positive lead 43 and the casing 1. The insulation member 72 insulates the positive lead 43 and the cover 112 of the casing 1.

The negative lead 44 is connected to the negative current collector tabs 42 and a connector terminal 46. The connector terminal 46 is electrically connected to the terminal 7 through the current interruption device 10. Thus, the negative current collector tabs 42 and the terminal 7 are electrically connected through the negative lead 44, the connector terminal 46, and the current interruption device 10. Due to this, a current path connecting the electrode assembly 3 and the terminal 7 is thereby formed. The current interruption device 10 is capable of interrupting this current path. A configuration of the current interruption device 10 will be described later. An insulation member 73 is disposed between the negative lead 44 and the casing 1. The insulation member 73 insulates the negative lead 44 and the casing 1.

Resin gaskets 62, 63 are disposed on an upper surface of the cover 112. The gasket 62 includes a protrusion 66 protruding upward from the cover 112, and a flat plate portion 68 extending along the cover 112. The protrusion 66 is disposed on a center side with respect to the opening 81 of the cover 112, and the flat plate portion 68 is disposed on an opening 81 side of the cover 112 with respect to the protrusion 66. An external terminal 60 is disposed on an upper surface of the gasket 62 so as to extend along a shape of the upper surface of the gasket 62. A head of a bolt 64 is disposed in a bottomed hole 62a provided in the protrusion 66. A shank of the bolt 64 passes through an opening in the external terminal 60 and protrudes upward. The terminal 5, the external terminal 60, and the bolt 64 are electrically connected to each other, and constitute a positive terminal. Configurations of the gasket 63, an external terminal 61, and a bolt 65 are identical to those of the gasket 62, the external terminal 60, and the bolt 64 as aforementioned. The terminal 7, the external terminal 61, and the bolt 65 are electrically connected to each other, and constitute a negative terminal.

Figure 2:
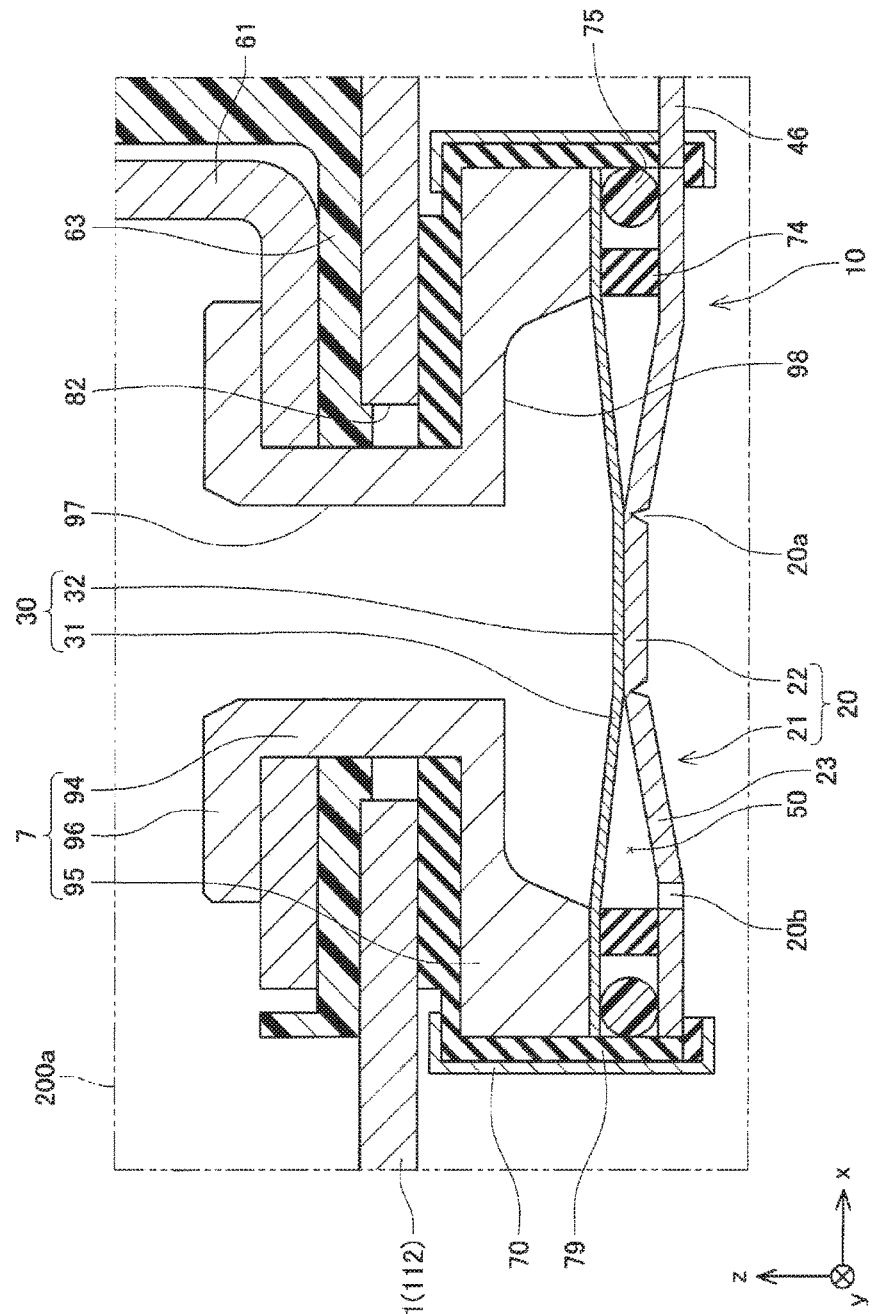
FIG. 2 is an enlarged view of a dotted-line portion 200$a$ of FIG. 1, and is a diagram showing a conductive state of a current interruption device of the first embodiment.

Here, the terminal 7 will be described with reference to FIG. 2. As shown in FIG. 2, the terminal 7 is rivet-fixed to the casing 1. The terminal 7 comprises a cylinder portion 94, a base portion 95, and a fixing portion 96. The cylinder portion 94 is inserted in the opening 82. The cylinder portion 94 is provided with a through hole 97 therein. The base portion 95 has a ring shape. The base portion 95 is fixed to a lower end of the cylinder portion 94. The base portion 95 is disposed inside the casing 1. The base portion 95 is provided with a recess 98. The recess 98 communicates with the through hole 97, and inside of the recess 98 is maintained at atmospheric pressure thereby. The fixing portion 96 has a ring shape, and is disposed at an upper end of the cylinder portion 94. The fixing portion 96 is disposed outside the casing 1. The terminal 7 is fixed to the cover 112 of the casing 1 by the fixing portion 96.

Next, the current interruption device 10 will be described. As shown in FIG. 2, the current interruption device 10 comprises the conductive plate 20 and the first deformable plate 30. The conductive plate 20 is a metal plate member having a constant thickness, and has conductivity. The conductive plate 20 has a circular shape when seen in a plan view (along a z direction), and is disposed below the first deformable plate 30. The conductive plate 20 includes a peripheral portion 21 and a center portion 22. The peripheral portion 21 is provided with an inclined portion 23 adjacent to the center portion 22. When seen in a direction parallel to an upper surface of the center portion 22 (along an x direction or a y direction; for example, when seen along the y direction as shown in FIG. 2), the inclined portion 23 is inclined such that its distance to the first deformable plate 30 increases at positions of the inclined portion 23 that are farther away from the center portion 22. That is, the inclined portion 23 inclines downward from the center portion 22 toward an outer periphery. The center portion 22 has a planar shape spreading in the x direction and the y direction (horizontal direction). The peripheral portion 21 of the conductive plate 20 is bent at an outer peripheral end of the inclined portion 23 and extends along the horizontal direction (the x direction or the y direction) therefrom, and the connector terminal 46 is connected to an outer peripheral edge of the peripheral portion 21. A groove 20a is provided in a lower surface of the conductive plate 20. The groove 20a is provided around the center portion 22, and the conductive plate 20 and the first deformable plate 30 are connected on an inner side with respect to the groove 20a. A mechanical strength of the conductive plate 20 at a position where the groove 20a is provided is lower than a mechanical strength of the conductive plate 20 at positions other than the position of the groove 20a. The conductive plate 20 is provided with a ventilation hole 20b therein, and a space 50 between the first deformable plate 30 and the conductive plate 20 communicates with a space inside the casing 1 therethrough.

The first deformable plate 30 is a conductive diaphragm which has a circular shape and protrudes downward when seen in the plan view (seen along the z direction). A thickness of the first deformable plate 30 is constant, and is thinner than the thickness of the conductive plate 20. The first deformable plate 30 includes a first facing portion 31 and a contact portion 32. The contact portion 32 is connected to the center portion 22 of the conductive plate 20 by welding. The first facing portion 31 is provided at a position facing the inclined portion 23 of the conductive plate 20. That is, when seen in the plan view, a length of the first facing portion 31 of the first deformable plate 30 in a radial direction and a length of the inclined portion 23 of the conductive plate 20 in the radial direction become substantially equal. When seen along the x direction or the y direction, the first facing portion 31 is inclined such that its distance to the conductive plate 20 increases at positions of the first facing portion 31 that are farther away from the contact portion 32. That is, the first facing portion 31 inclines upward from the contact portion 32 toward an outer periphery. An outer peripheral side of the first facing portion 31 is connected to a peripheral portion of a lower surface of the base portion 95, and a lower end of the recess 98 of the base portion 95 is covered by the first deformable plate 30. Inside of the recess 98 is maintained at the atmospheric pressure, and thus this atmospheric pressure acts on an upper surface of the first deformable plate 30.

Figure 3:
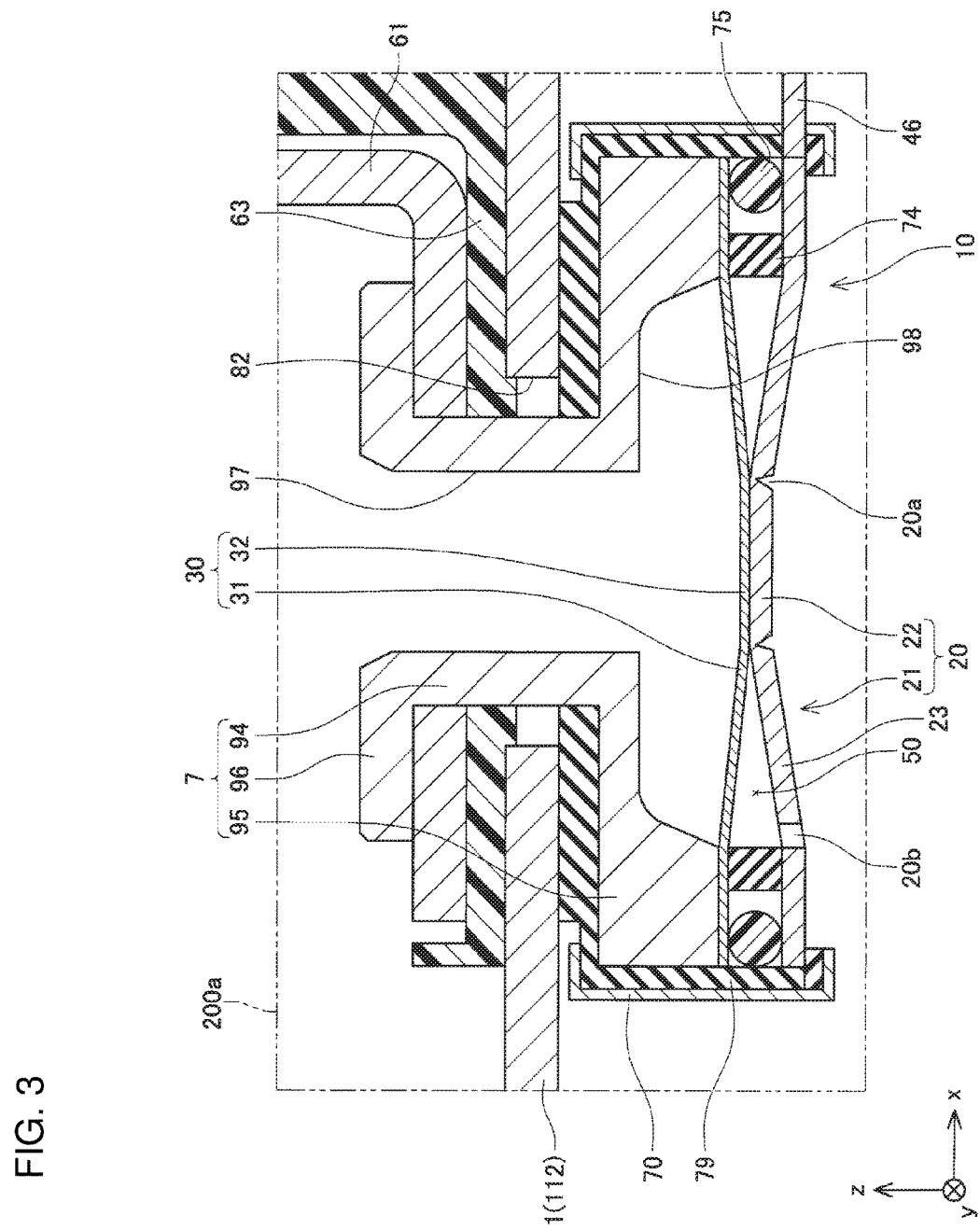
FIG. 3 is an enlarged view of a variant of the current interruption device of the first embodiment.

A sealing member 75 is provided between the conductive plate 20 and the peripheral portion of the base portion 95. The sealing member 75 contacts the lower surface of the base portion 95 and the upper surface of the conductive plate 20, and extends in a ring shape in a circumferential direction along an outer peripheral side of the base portion 95. The sealing member 75 provides seal between the base portion 95 and the conductive plate 20. The sealing member 75 is, for example, an O-ring constituted of an ethylene-propylene-based rubber (EPM) material such as ethylene propylene diene rubber (EPDM). The sealing member 75 may not be limited to the above, and a material having sealing property, insulation, electrolyte durability, and elasticity may be used. Further, an insulation member 74 is disposed between the conductive plate 20 and the first deformable plate 30. The insulation member 74 is a ring-shaped member, and is in contact with a portion of the conductive plate 20 that is on an outer side with respect to the inclined portion 23 and a portion of the first deformable plate 30 that is on the outer side with respect to the first facing portion 31. The insulation member 74 is disposed on the inner side with respect to the sealing member 75. As shown in FIG. 3, the inclined portion 23 may extend toward its outer peripheral side such that a position of the outer peripheral end of the inclined portion 23 of the conductive plate 20 in the plan view is located at the substantially same position as an inner peripheral end of the insulation member 74. In this case, the ventilation hole 20b is provided in the inclined portion 23.

The conductive plate 20, the first deformable plate 30, and the base portion 95 are fixed by a fixing member 70. The fixing member 70 rivet-fixes the conductive plate 20, the first deformable plate 30, and the base portion 95. An insulation member 79 is disposed on the inner side with respect to the fixing member 70. The insulation member 79 insulates the conductive plate 20, the first deformable plate 30, and the terminal 7 (the base portion 95) from the fixing member 70.

As apparent from the foregoing description, the current interruption device 10 includes a current path that serially connects the connector terminal 46, the conductive plate 20, the first deformable plate 30, and the terminal 7. Due to this, the electrode assembly 3 and the terminal 7 are electrically connected through the current path of the current interruption device 10.

Here, an interruption operation of the current interruption device 10 will be described. The aforementioned electricity storage device 100 is used in a conductive state in which the terminal 5 and the terminal 7 can be electrically conducted via an external apparatus (such as a generator or a motor). When a pressure inside the casing 1 increases due to overcharging or the like of the electricity storage device 100, a pressure acting on a lower surface of the first deformable plate 30 increases through the ventilation hole 20b. Meanwhile, the atmospheric pressure acts on the upper surface of the first deformable plate 30. Due to this, when the internal pressure of the casing 1 increases to reach a predetermined value, the first deformable plate 30 is inverted and changes its state to a state of protruding upward. When this happens, the conductive plate 20, which had been connected to the contact portion 32 of the first deformable plate 30, breaks with the groove 20a, which is mechanically weak, as a breakage point. Due to this, the current path connecting the conductive plate 20 and the first deformable plate 30 is interrupted, and the electrode assembly 3 and the terminal 7 shift to a non-conductive state. At this occasion, the first deformable plate 30 is insulated from the connector terminal 46, and the conductive plate 20 is also insulated from the terminal 7.

Figure 4:
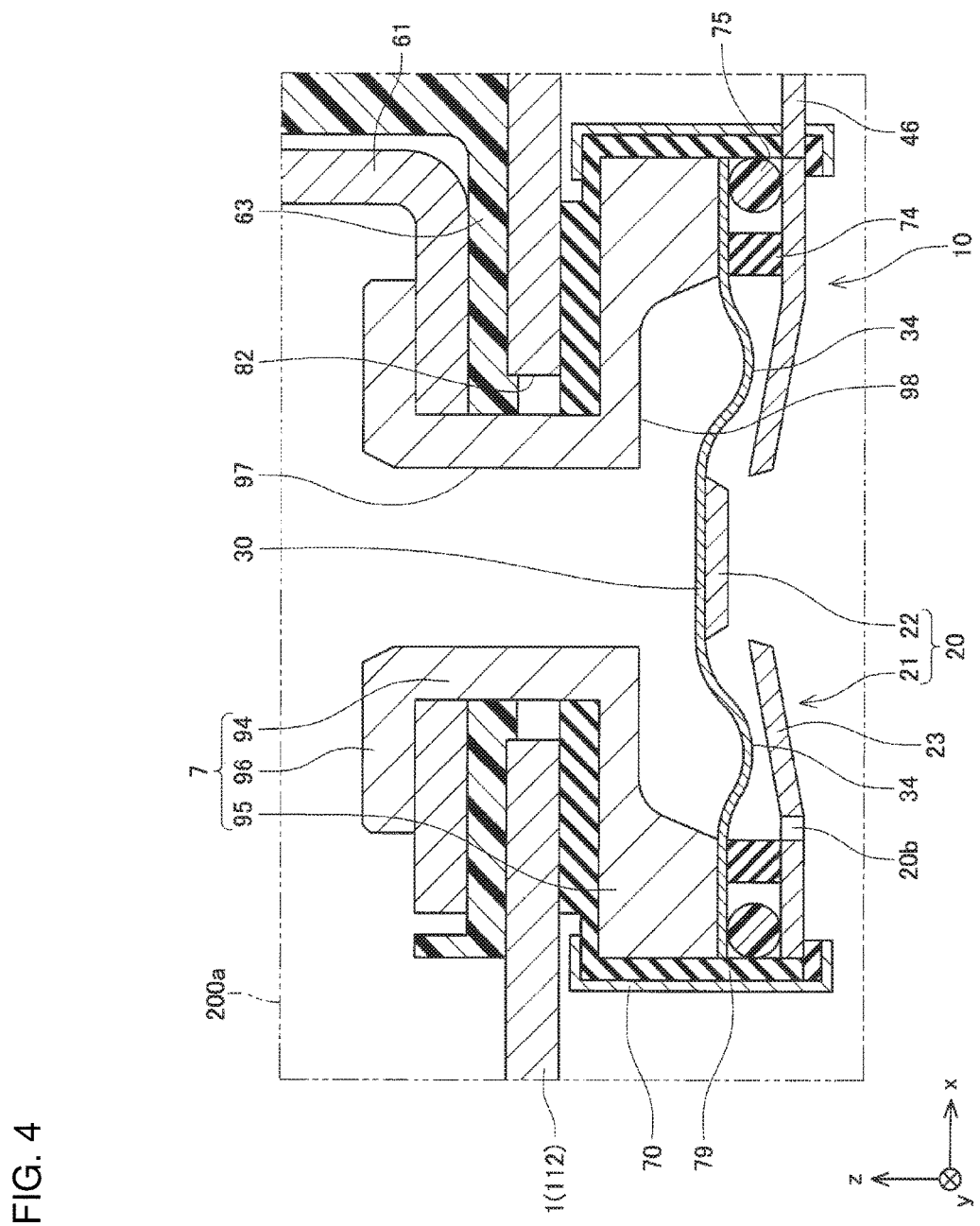
FIG. 4 is an enlarged view showing a state (non-conductive state) after activation of the current interruption device of FIG. 2 (a diagram corresponding to the dotted-line portion 200$a$ of FIG. 1)

As shown in FIG. 4, when the current interruption device 10 operates and the non-conductive state is realized, the first deformable plate 30 may be bent near an intermediate point between its portion connected to the base portion 95 and the contact portion 32. That is, the thickness of the first deformable plate 30 is thin, and thus the mechanical strength thereof is low. Due to this, when the conductive plate 20 breaks and an instantaneous large force is applied to the first deformable plate 30, the first deformable plate 30 is bent near the intermediate point. At this occasion, as shown in FIG. 4, a bent portion 34 of the first deformable plate 30 protrudes downward than other portions of the first deformable plate 30. In the aforementioned electricity storage device 100, since the inclined portion 23 of the conductive plate 20 and the first facing portion 31 of the first deformable plate 30 are inclined downward and upward respectively, the distance between them is designed to become longer toward an outer peripheral end of the conductive plate 20. Due to this, after the current interruption device 10 has been operated, a distance between the bent portion 34 and the conductive plate 20 can sufficiently be secured, and thereby the bent portion 34 of the first deformable plate 30 and the conductive plate 20 can be suppressed from making contact each other. Due to this, the first deformable plate 30 and the conductive plate 20 can be suppressed from regaining the conduction therebetween.

Further, in the current interruption device 10 of the present embodiment, the conductive plate 20 is constituted by a plate material having a constant thickness. Due to this, as compared to a conventional technique, formation of the conductive plate 20 becomes easier, and material cost and processing cost thereof can further be reduced.

Second Embodiment

Next, an electricity storage device of a second embodiment will be described with reference to FIG. 5. Hereinbelow, only features differing from those of the first embodiment will be described, and detailed description of configurations that are identical to those of the first embodiment will be omitted. In the electricity storage device of the present embodiment, a configuration of a current interruption device differs from that of the first embodiment, and other configurations are identical to those of the first embodiment.

Figure 5:
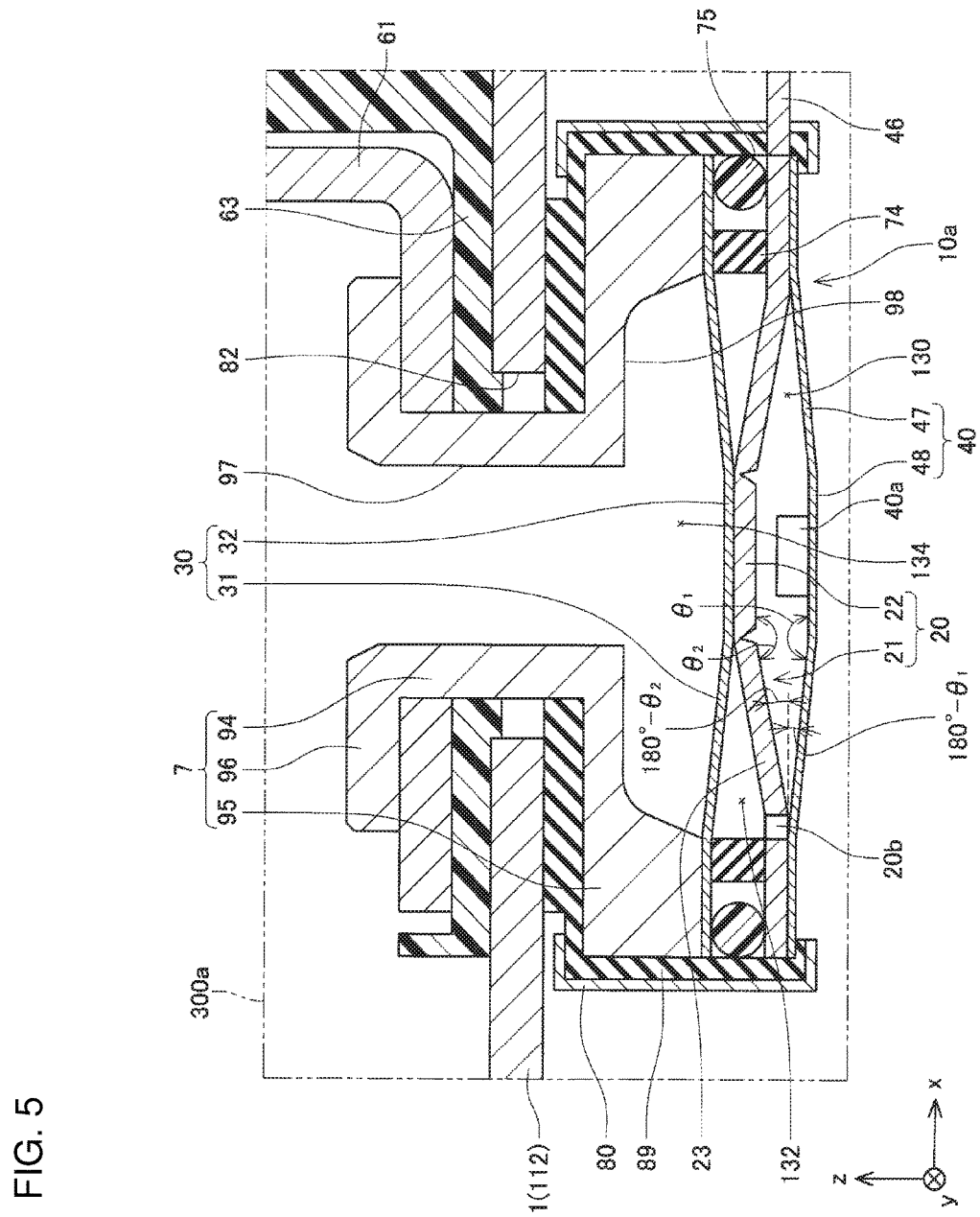
FIG. 5 is an enlarged view of a current interruption device equipped in an electricity storage device of a second embodiment (a diagram corresponding to the dotted-line portion 200$a$ of FIG. 1)

As shown in FIG. 5, a current interruption device 10a comprises the conductive plate 20, the first deformable plate 30, and a second deformable plate 40 constituted of metal.

The second deformable plate 40 is a circular diaphragm. When seen in the plan view (when seen along the z direction), a center position of the second deformable plate 40 substantially matches a center position of the first deformable plate 30 and a center position of the conductive plate 20. The second deformable plate 40 includes a second facing portion 47 and a central portion 48. The second deformable plate 40 is disposed below the conductive plate 20, and its central portion 48 protrudes downward. The second facing portion 47 is provided at a position facing the inclined portion 23 of the conductive plate 20. That is, when seen in the plan view, a length of the second facing portion 47 of the second deformable plate 40 in the radial direction and the length of the inclined portion 23 of the conductive plate 20 in the radial direction become substantially equal. When seen along the x direction or the y direction, the second facing portion 47 is inclined such that its distance to the conductive plate 20 decreases at positions of the second facing portion 47 that are farther away from the central portion 48. That is, the second facing portion 47 inclines upward from the central portion 48 toward an outer periphery. Since the central portion 48 has a planar shape spreading in the x and y directions (horizontal direction), an angle formed by an upper surface of the central portion 48 and an upper surface of the second facing portion 47 is set to $\theta_1$. In this embodiment, an angle $\theta_2$ formed by a lower surface of the inclined portion 23 and the lower surface of the center portion 22 is set to be smaller than the angle $\theta_1$ formed by the upper surface of the central portion 48 and the upper surface of the second facing portion 47. The upper surface of the second facing portion 47 of the second deformable plate 40 on an outer peripheral side is fixed to a lower surface of the peripheral portion of the conductive plate 20 by welding. Further, the upper surface of the central portion 48 of the second deformable plate 40 is provided with a protrusion 40a protruding upward. The center portion 22 of the conductive plate 20 is located above the protrusion 40a. A pressure in a space 130 inside the casing 1 is applied to a upper surface of the second deformable plate 40 (to be described later). The space 130 is sealed from a space within the casing 1.

The conductive plate 20 is disposed between the second deformable plate 40 and the first deformable plate 30, and the ventilation hole 20b is provided in the conductive plate 20. The space 130 communicates with a space 132 between the first deformable plate 30 and the conductive plate 20 through the ventilation hole 20b. The first deformable plate 30 is disposed above the conductive plate 20. A space 134 is provided above the upper surface of the first deformable plate 30. The space 134 is maintained at the atmospheric pressure.

The second deformable plate 40, the conductive plate 20, the first deformable plate 30, and the base portion 95 are fixed by a fixing member 80. The fixing member 80 rivet-fixes the second deformable plate 40, the conductive plate 20, the first deformable plate 30, and the base portion 95. An insulation member 89 is disposed on the inner side with respect to the fixing member 80. The insulation member 89 insulates the second deformable plate 40, the conductive plate 20, the first deformable plate 30, and the terminal 7 (the base portion 95) from the fixing member 80.

The current interruption device 10a includes the current path that serially connects the connector terminal 46, the conductive plate 20, the first deformable plate 30, and the terminal 7. Due to this, the electrode assembly 3 and the terminal 7 are electrically connected through the current path of the current interruption device 10a.

Here, an interruption operation of the current interruption device 10a will be described. In the aforementioned electricity storage device, when a pressure inside the casing 1 increases, the pressure acting on the lower surface of the second deformable plate 40 increases. Meanwhile, the pressure in the space 130 sealed from the space within the casing 1 is applied to the upper surface of the second deformable plate 40. Due to this, when the internal pressure of the casing 1 increases to reach a predetermined value, the second deformable plate 40 is inverted and changes its state form the state of protruding downward to a state of protruding upward. When this happens, air inside the space 130 moves to the space 132 through the ventilation hole 20b, and a pressure in the space 132 increases. Further, when the second deformable plate 40 is inverted, the protrusion 40a of the second deformable plate 40 collies with the center portion 22 of the conductive plate 20, as a result of which the conductive plate 20 breaks along the groove 20a. Due to this, the first deformable plate 30 is inverted, and the first deformable plate 30 as well as the center portion 22 of the conductive plate 20 is displaced upward. Due to this, the current path connecting the conductive plate 20 and the first deformable plate 30 is interrupted, and the conduction between the electrode assembly 3 and the terminal 7 is interrupted. At this occasion, the first deformable plate 30 is insulated from the connector terminal 46, and the conductive plate 20 is also insulated from the terminal 7. In the electricity storage device of the second embodiment as well, the conductive plate 20 and the first deformable plate 30 are inclined in a similar manner to those in the first embodiment, and thus the same effects as those of the electricity storage device 100 can be achieved.

Further, in the current interruption device 10a of the present embodiment, the angle $\theta_2$ formed by the lower surface of the inclined portion 23 and the lower surface of the center portion 22 is set to be smaller than the angle $\theta_1$ formed by the upper surface of the central portion 48 and the upper surface of the second facing portion 47. That is, in the space surrounded by the conductive plate 20 and the second deformable plate 40, a space provided above a position where the conductive plate 20 and the second deformable plate 40 make contact becomes larger than a space provided below the position where the conductive plate 20 and the second deformable plate 40 make contact. Due to this, a space for the inversion of the second deformable plate 40 can be secured upon the operation of the current interruption device 10a, and the second deformable plate 40 can suitably be inverted.

Third Embodiment

Next, an electricity storage device of a third embodiment will be described with reference to FIGS. 6 and 7. The electricity storage device of the third embodiment differs from that of the first embodiment regarding configurations of respective members (162, 163, 164, 165, etc.) disposed on the upper surface of the cover 112 and a configuration of a conductive plate 120. Since other configurations are similar to those of the first embodiment, detailed description thereof will be omitted.

Figure 6:
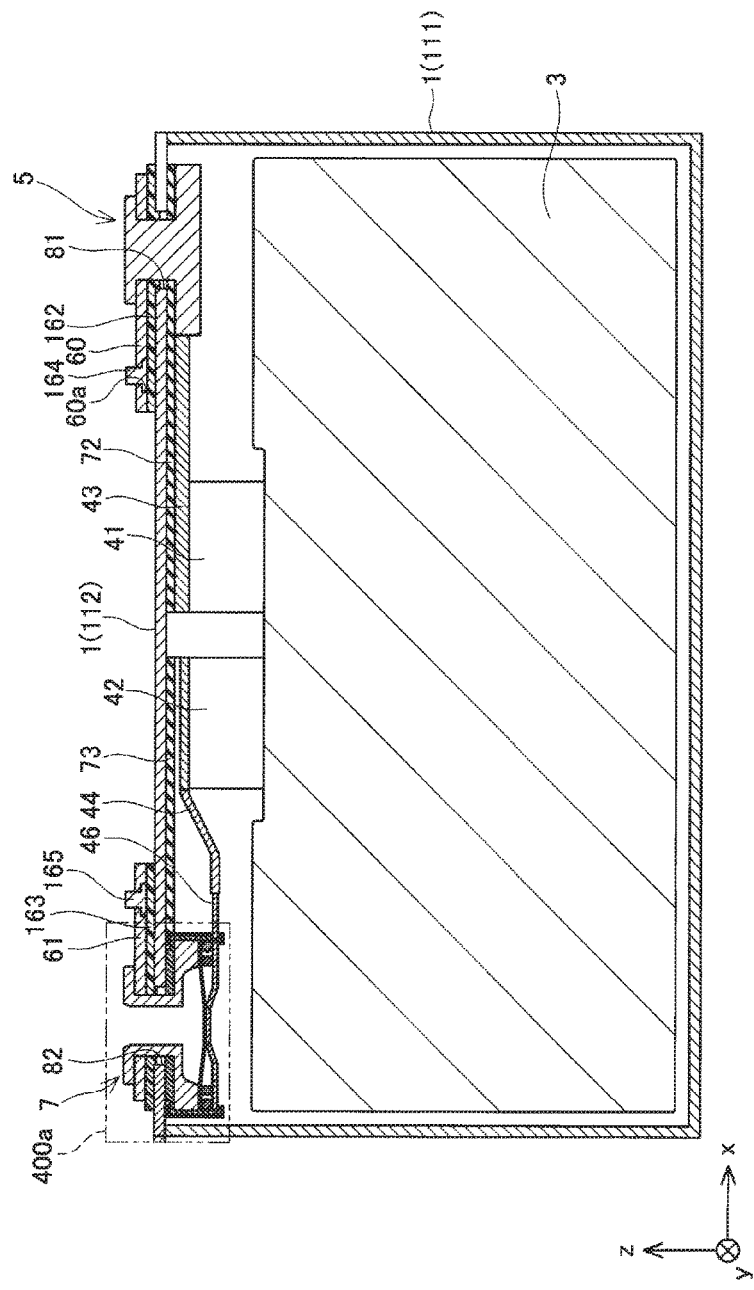
FIG. 6 is a vertical cross-sectional view of an electricity storage device of a third embodiment.

As shown in FIG. 6, resin gaskets 162, 163 are disposed on the upper surface of the cover 112. The terminal 60 is disposed on an upper surface of the gasket 162. The external terminal 60 is provided with a through hole 60a therein. The through hole 60a has a larger size on a lower surface side of the external terminal 60 as compared to an upper surface side of the external terminal 60. The gasket 162 insulates the cover 112 from the external terminal 60. A bolt 164 passes through the through hole 60a. Specifically, a head of the bolt 164 is accommodated in the through hole 60a. Further, a shank of the bolt 164 passes through the through hole 60a and protrudes upward from the external terminal 60. The terminal 5, the external terminal 60, and the bolt 164 are electrically connected to each other, and constitute a positive terminal. Configurations of the gasket 163, the external terminal 61, and a bolt 165 are identical to those of the gasket 162, the external terminal 60, and the bolt 164 as aforementioned. The terminal 7, the external terminal 61, and the bolt 165 are electrically connected to each other, and constitute a negative terminal.

Figure 7:
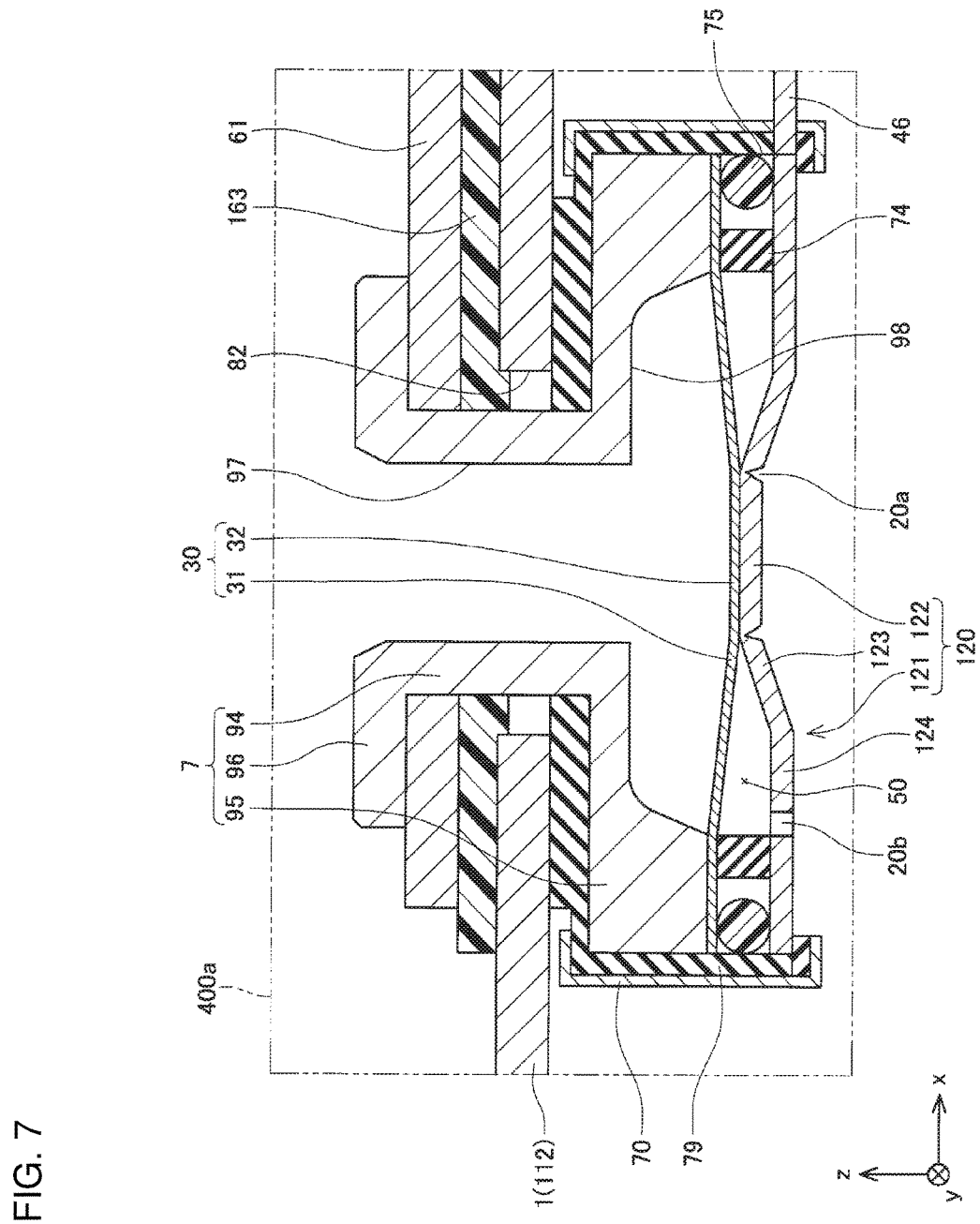
FIG. 7 is an enlarged view of a dotted-line portion 400$a$ of FIG. 6, and is a diagram showing a conductive state of a current interruption device of the third embodiment.

As shown in FIG. 7, the conductive plate 120 includes a peripheral portion 121 and a center portion 122. An inclined portion 123 and a flat portion 124 are provided in the peripheral portion 121 of the conductive plate 120. The inclined portion 123 is provided adjacent to an outer peripheral end of the center portion 122. The flat portion 124 is provided adjacent to an outer peripheral end of the inclined portion 123. The flat portion 124 is bent at the outer peripheral end of the inclined portion 123 and extends in the horizontal direction, and the connector terminal 46 is connected to an outer peripheral edge of the flat portion 124. A position of a boundary between the inclined portion 123 and the flat portion 124 when seen in the plan view is located on the inner side in the radial direction with respect to the position of the inner peripheral end of the insulation member 74.

In the electricity storage device of the third embodiment, as compared to the first embodiment, the inclined portion 123 is given an acute angle relative to an xy plane. Due to this, a greater distance can be secured between the first deformable plate 30 and the conductive plate 120 when the first deformable plate 30 is bent (see FIG. 4). That is, the first deformable plate 30 and the conductive plate 120 are further suppressed from regaining the conduction therebetween.

The configurations of the gaskets 162, 163, the bolts 164, 165 and the like may be used in other embodiments described earlier.

Fourth Embodiment

Figure 8:
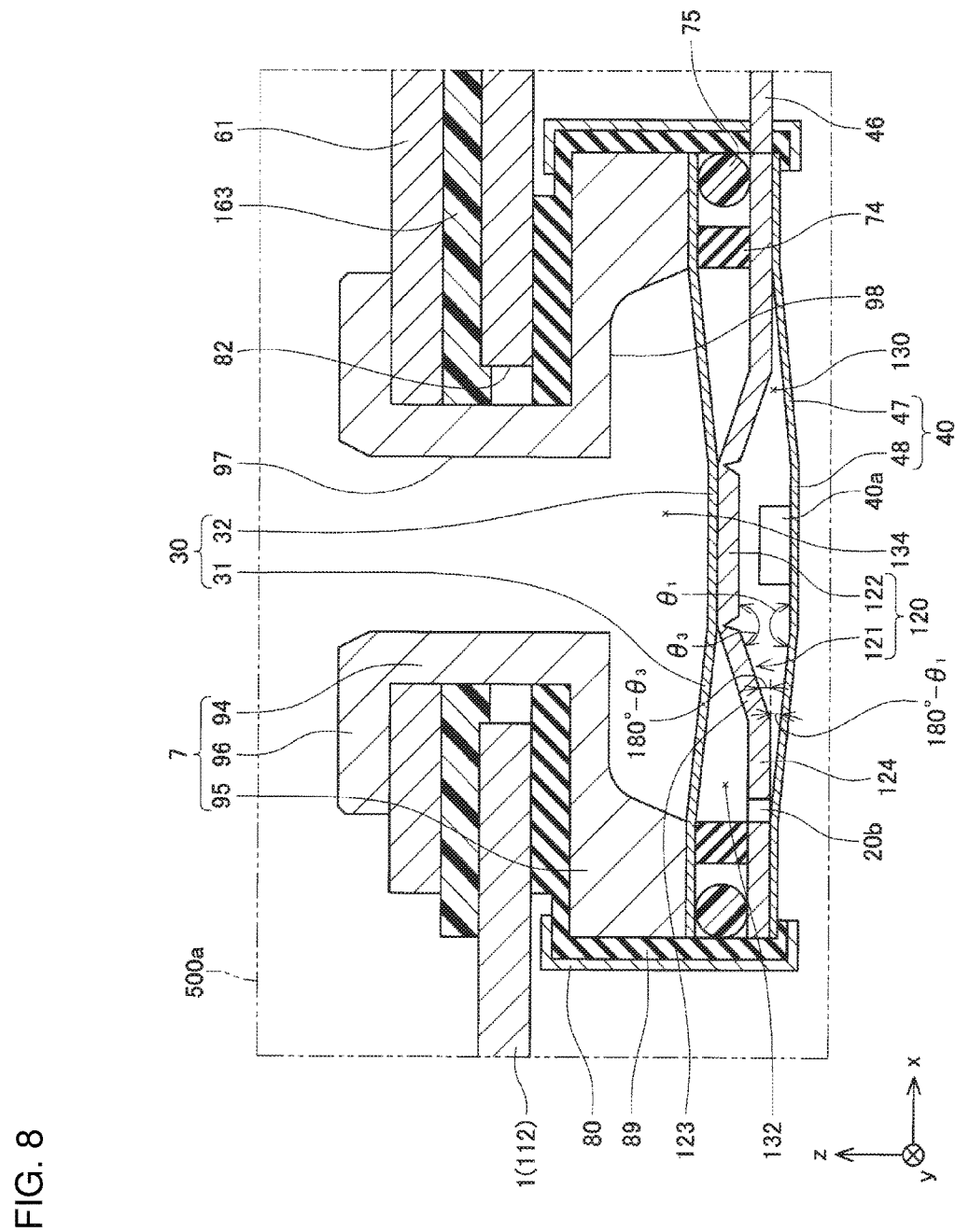
FIG. 8 is an enlarged view of a current interruption device equipped in an electricity storage device of a fourth embodiment (a diagram corresponding to the dotted-line portion 400$a$ of FIG. 6)

Next, an electricity storage device of a fourth embodiment will be described with reference to FIG. 8. In the fourth embodiment, it includes the second deformable plate 40 described in the second embodiment in addition to the configuration of the third embodiment. As shown in FIG. 8, the second facing portion 47 of the second deformable plate 40 is provided at a position facing the inclined portion 123 and the flat portion 124 of the conductive plate 120. That is, when seen in the plan view, the length of the second facing portion 47 of the second deformable plate 40 in the radial direction and a length obtained by adding lengths of the inclined portion 123 and the flat portion 124 of the conductive plate 120 in the radial direction become substantially equal. In this embodiment, an angle $\theta_3$ formed by a lower surface of the inclined portion 123 and the lower surface of the center portion 122 is set to be smaller than the angle $\theta_1$ formed by the upper surface of the central portion 48 and the upper surface of the second facing portion 47.

In the electricity storage device of the fourth embodiment as well, the conductive plate 120 and the first deformable plate 30 are inclined in a similar manner to those of the first embodiment, and thus the same effects as those of the electricity storage device 100 of the first embodiment can be achieved.

Fifth Embodiment

Figure 9:
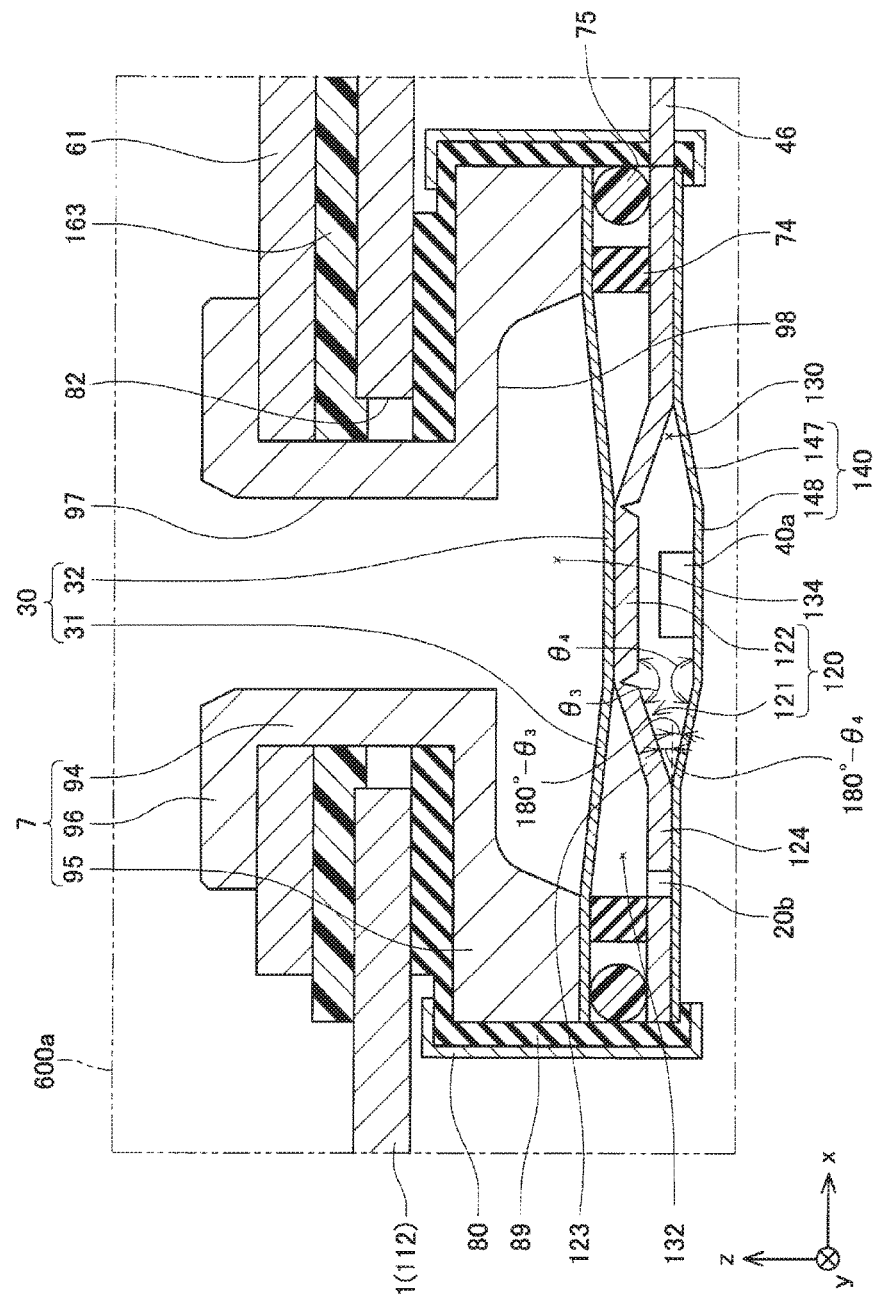
FIG. 9 is an enlarged view of a current interruption device equipped in an electricity storage device of a fifth embodiment (a diagram corresponding to the dotted-line portion 400$a$ of FIG. 6)

Next, an electricity storage device of a fifth embodiment will be described with reference to FIG. 9. In the fifth embodiment, a configuration of a second deformable plate differs from that of the fourth embodiment, and other configurations are similar to those of the fourth embodiment. As shown in FIG. 9, a second deformable plate 140 includes a second facing portion 147 and a central portion 148. The second facing portion 147 of the second deformable plate 140 is provided at a position facing the inclined portion 123 of the conductive plate 120. The second deformable plate 140 is connected to the conductive plate 120 on an outer peripheral side of the second facing portion 147. That is, when seen in the plan view, a length of the second facing portion 147 of the second deformable plate 140 in the radial direction and the length of the inclined portion 123 of the conductive plate 120 in the radial direction become substantially equal, and a position of an outer peripheral end of the second facing portion 147 of the second deformable plate 140 is located on the inner side in the radial direction with respect to the position of the inner peripheral end of the insulation member 74. In this embodiment, the angle $\theta_3$ formed by the lower surface of the inclined portion 123 and the lower surface of the center portion 122 is set to be smaller than an angle $\theta_4$ formed by an upper surface of the central portion 148 and an upper surface of the second facing portion 147.

In the electricity storage device of the fifth embodiment as well, the conductive plate 120 and the first deformable plate 30 are inclined in a similar manner to those of the first embodiment, and thus the same effects as those of the electricity storage device 100 of the first embodiment can be achieved.

Sixth Embodiment

Figure 10:
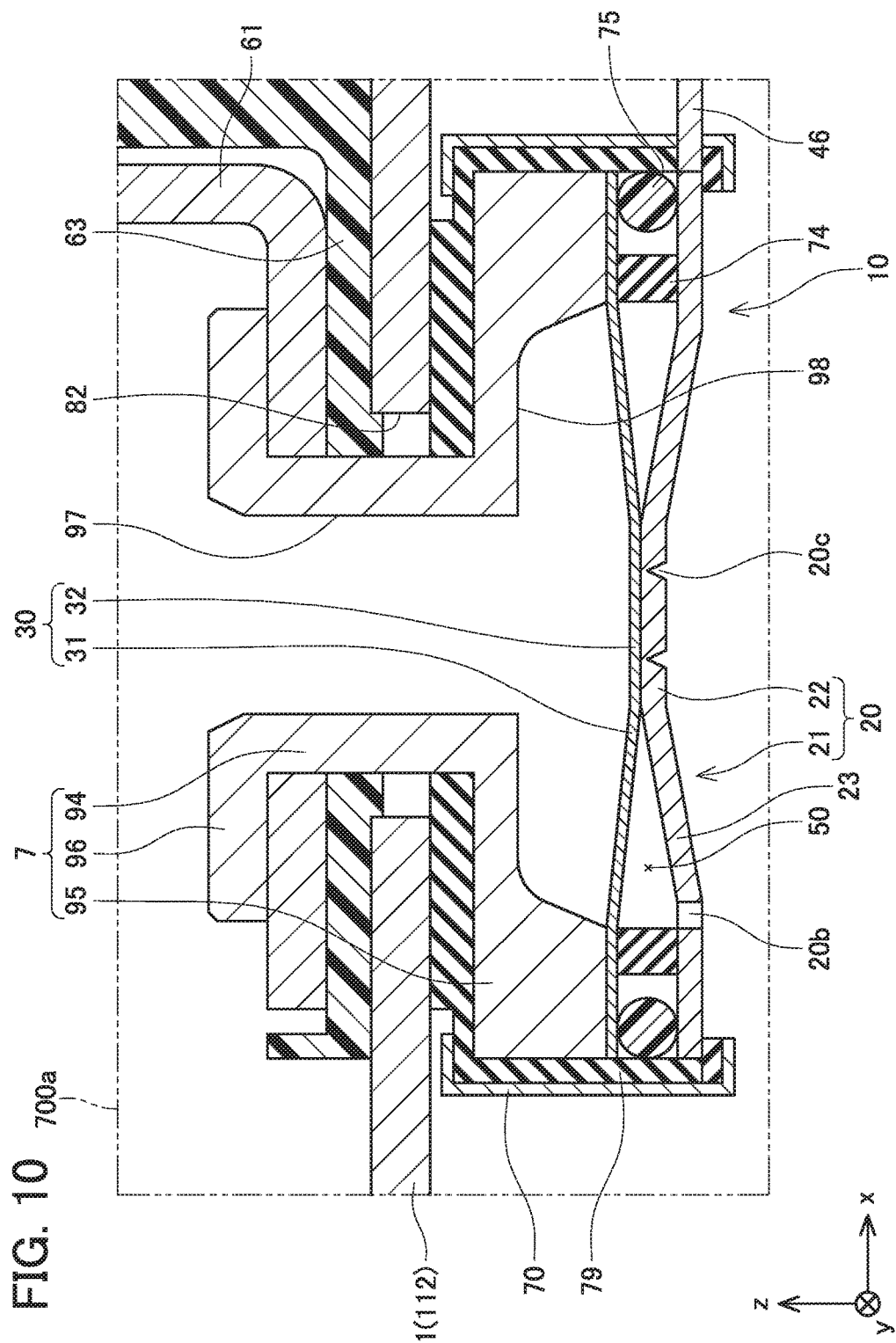
FIG. 10 is an enlarged view of a current interruption device equipped in an electricity storage device of a sixth embodiment (a diagram corresponding to the dotted-line portion 200a of FIG. 2).

Next, an electricity storage device of a sixth embodiment will be described with reference to FIG. 10. The sixth embodiment differs from the first embodiment regarding the position of the groove of the conductive plate 20. In the first embodiment, the groove 20*a* is provided at a boundary between the center portion 21 and the inclined portion 23 of the conductive plate 20, however, a groove 20*c* of the conductive plate 20 of the sixth embodiment is provided in the center portion 21 of the conductive plate 20. That is, when seen in the plan view, the groove 20*c* is provided on the inner side with respect to the boundary between the center portion 21 and the inclined portion 23 in the radial direction of the conductive plate 20.

The conductive plate may be formed into the shape shown in the drawings after the groove has been formed in the plate member. Further, breaking load (load by which the conductive plate 20 breaks due to the pressure inside the casing) is determined according to the shape and depth of the groove. As such, in the electricity storage device of the sixth embodiment, stress applied to the groove 20*c* and deformation of the groove 20*c* upon forming the conductive plate 20 can be suppressed as compared to a case of providing the groove 20*c* at the position that is to be the boundary between the center portion 21 and the inclined portion 23, as a result of which the breaking load can be stabilized. That is, manufacture variations of the electricity storage devices can be reduced.

While specific examples of the present invention have been described above in detail, these examples are merely illustrative and place no limitation on the scope of the patent claims. The technology described in the patent claims also encompasses various changes and modifications to the specific examples described above. For example, in the second embodiment, a communication hole that communicates the space 132 and the space 134 may be provided in the first deformable plate 30 to maintain the spaces 130, 132 at the atmospheric pressure.

Further, the current interruption device 10 may be provided at the terminal 5, or may be provided at each of the terminal 5 and the terminal 7. In a case where the current interruption device 10 is provided at the terminal 5, an insulation member may be disposed between the terminal 5 and the cover 112 similarly to the aforementioned embodiments. Further, in the aforementioned embodiments, the conduction with the conductive plate 20 is interrupted by the first deformable plate 30 being inverted. However, a manner by which the first deformable plate 30 deforms is not limited to such inversion. For example, the conductive plate 20 may be configured to break with the groove 20*a* as the breakage point by the contact portion 32 of the first deformable plate 30 warping upward to interrupt the conduction between the first deformable plate 30 and the conductive plate 20. The first deformable plate 30 may deform in any way so long as the conduction between the first deformable plate 30 and the conductive plate 20 is thereby interrupted. The same applies to the second deformable plate 40.

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A current interruption device accommodated in a casing and configured to switch between a conductive state where an electrode assembly accommodated in the casing and an electrode terminal provided on the casing are electrically connected and a non-conductive state where the electrode assembly and the electrode terminal are electrically disconnected, the current interruption device comprising:
- a conductive plate configured to be electrically connected to the electrode assembly; and
- a first deformable plate disposed to face the conductive plate and configured to be electrically connected to the electrode terminal, wherein the conductive plate includes a center portion and a peripheral portion surrounding the center portion, the first deformable plate is configured to make contact with and be electrically connected to the conductive plate at the center portion in the conductive state, and the first deformable plate is configured to be separated from and be electrically disconnected from the conductive plate in the non-conductive state, an upper surface of the center portion of the conductive plate has a planar shape spreading in a first direction and a second direction orthogonal to the first direction in the conductive state, the peripheral portion of the conductive plate includes an inclined portion extending outward from a boundary between the center portion and the peripheral portion, and when the conductive plate and the first deformable plate are viewed along the first direction or the second direction in the conductive state, an upper surface of the inclined portion is inclined such that a distance from the upper surface of the inclined portion to the first deformable plate increases at portions of the upper surface of the inclined portion that are located farther away from the center portion.

2. The current interruption device according to claim 1, wherein
a member which applies biasing force to the first deformable plate is not interposed between the conductive plate and the first deformable plate.

3. The current interruption device according to claim 1, wherein
only air in the casing is present between the inclined portion of the conductive plate and the first deformable plate.

4. The current interruption device according to claim 1, wherein
the conductive plate breaks at between the center portion and the peripheral portion of the conductive plate when the current interruption device is switched from the conductive state to the non-conductive state, and the center portion moves together with the first deformable plate.

5. The current interruption device according to claim 1, wherein
the first deformable plate includes a contact portion which makes contact with the center portion of the conductive plate in the conductive state, and a first facing portion which faces the inclined portion of the conductive plate, and when the conductive plate and the first deformable plate are viewed along the first direction or the second direction in the conductive state, a lower surface of the first facing portion of the first deformable plate is inclined such that a distance from the lower surface of the first facing portion of the first deformable plate to the inclined portion of the conductive plate increases at portions of the lower surface of the first facing portion that are located farther away from the contact portion of the first deformable plate.

6. The current interruption device according to claim 1, wherein
a thickness of the conductive plate is constant at the inclined portion.

7. The current interruption device according to claim 1, further comprising:
a second deformable plate disposed on an opposite side to the first deformable plate with respect to the conductive plate and provided with a protrusion protruding toward the center portion of the conductive plate, wherein the second deformable plate is configured to be switched between a first state in which the protrusion is located at a first position and the first deformable plate is in contact with the conductive plate in the conductive state, and a second state in which the protrusion is moved from the first position to a second position on a conductive plate side and separates the first deformable plate from the conductive plate.

8. The current interruption device according to claim 7, wherein
the second deformable plate includes a central portion including the protrusion and a second facing portion facing the inclined portion of the conductive plate in the conductive state, when the conductive plate and the second deformable plate are viewed along the first direction or the second direction in the conductive state, an upper surface of the second facing portion of the second deformable plate is inclined such that a distance from the upper surface of the second facing portion of the second deformable plate to the inclined portion of the conductive plate decreases at portions of the upper surface of the second facing portion that are located farther away from the central portion in the second deformable plate, and an angle formed by a lower surface of the inclined portion and a lower surface of the center portion is smaller than an angle formed by an upper surface of the central portion and the upper surface of the second facing portion.

9. An electricity storage device comprising:
the current interruption device according to claim 1.

* * * * *